United States Patent
Yasuda et al.

(10) Patent No.: US 7,167,881 B2
(45) Date of Patent: Jan. 23, 2007

(54) METHOD FOR HEAP MEMORY MANAGEMENT AND COMPUTER SYSTEM USING THE SAME METHOD

(75) Inventors: Yoshiko Yasuda, Tokorozawa (JP); Shinichi Kawamoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 437 days.

(21) Appl. No.: 10/339,338

(22) Filed: Jan. 10, 2003

(65) Prior Publication Data
US 2003/0212719 A1   Nov. 13, 2003

(30) Foreign Application Priority Data
May 8, 2002   (JP) .............................. 2002-132324

(51) Int. Cl.
*G06F 17/30* (2006.01)
(52) U.S. Cl. .................................... 707/206
(58) Field of Classification Search ................ 707/206; 711/170–173
See application file for complete search history.

(56) References Cited

U.S. PATENT DOCUMENTS

| 5,652,883 A | 7/1997 | Adcock |
| 6,199,075 B1 | 3/2001 | Ungar et al. |
| 6,226,653 B1 | 5/2001 | Alpern et al. |

OTHER PUBLICATIONS

Jones et al. ("Generational Garbage Collection", Garbage Collection: Algorithms for Automatic Dynamic Memory Management, 1996, John Wiley & Sons, especially pp. 143-181).*

Ungar et al. ("Tenuring Policies for Generation-Based Storage Reclamation", 1988, ACM, pp. 1-17).*

Takaoka et al. ("Implementation and Evaluation of Adaptive Garbage Collection", Systems and Computers in Japan, vol. 31, No. 14, 2000, pp. 83-90).*

(Continued)

*Primary Examiner*—Joon Hwan Hwang
(74) *Attorney, Agent, or Firm*—Reed Smith LLP; Stanley P. Fisher, Esq.; Juan Carlos A. Marquez, Esq.

(57) ABSTRACT

There are provided a heap memory management method that not only improves processing performance of an application program but also reduces a program development cost and a computer system using the same method. A live object copy process in minor collection of generational garbage collection is implemented through a calculate process of object live ratio, a compare process of object live ratio, and a live object copy process. The calculate process of object live ratio calculates a ratio of a size of a memory allocated to live objects of new objects to a size of a memory allocated to a new object during minor collection. The compare process of object live ratio compares a calculated object live ratio with a predetermined threshold. The live object copy process copies a live object directly to an old-generation heap instead of a new-generation heap when the object live ratio exceeds the threshold as a result of comparison. Further, an application programmer provides means for setting the threshold that decides a copy destination of the live object as a runtime parameter of a program and means for holding the set threshold in a memory.

7 Claims, 11 Drawing Sheets

OTHER PUBLICATIONS

Richard Jones and Rafael Lins, "Garbage Collection: Algorithms for Automatic Dynamic Memory Management", John Wiley & Sons.

Eiko Tanaka, Atusi Maeda, Yoshio Tanaka, Masakazu Nakanishi, "Generational Garbage Collection Based on a Theoretical Analysis of Lifetime of Objects", Proceedings of the Information Processing Society of Japan, Apr. 1997, vol. 38, No. 4, pp. 835-844.

Richard Jones and Rafael Lins, "Generational Garbage Collection", Garbage Collection: Algorithms for Automatic Dynamic Memory Management, 1996, John Wiley & Sons, pp. 143-181.

* cited by examiner

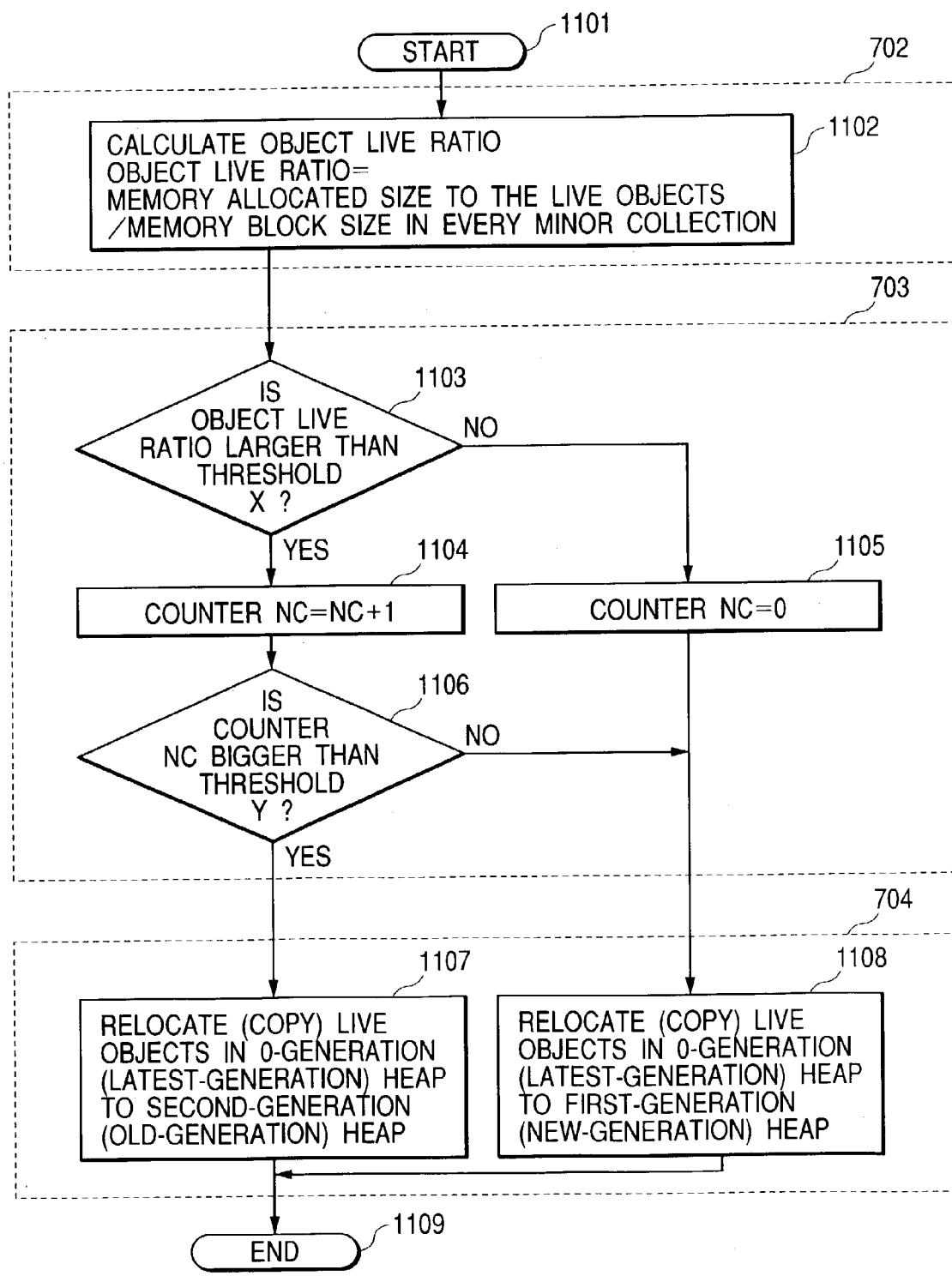

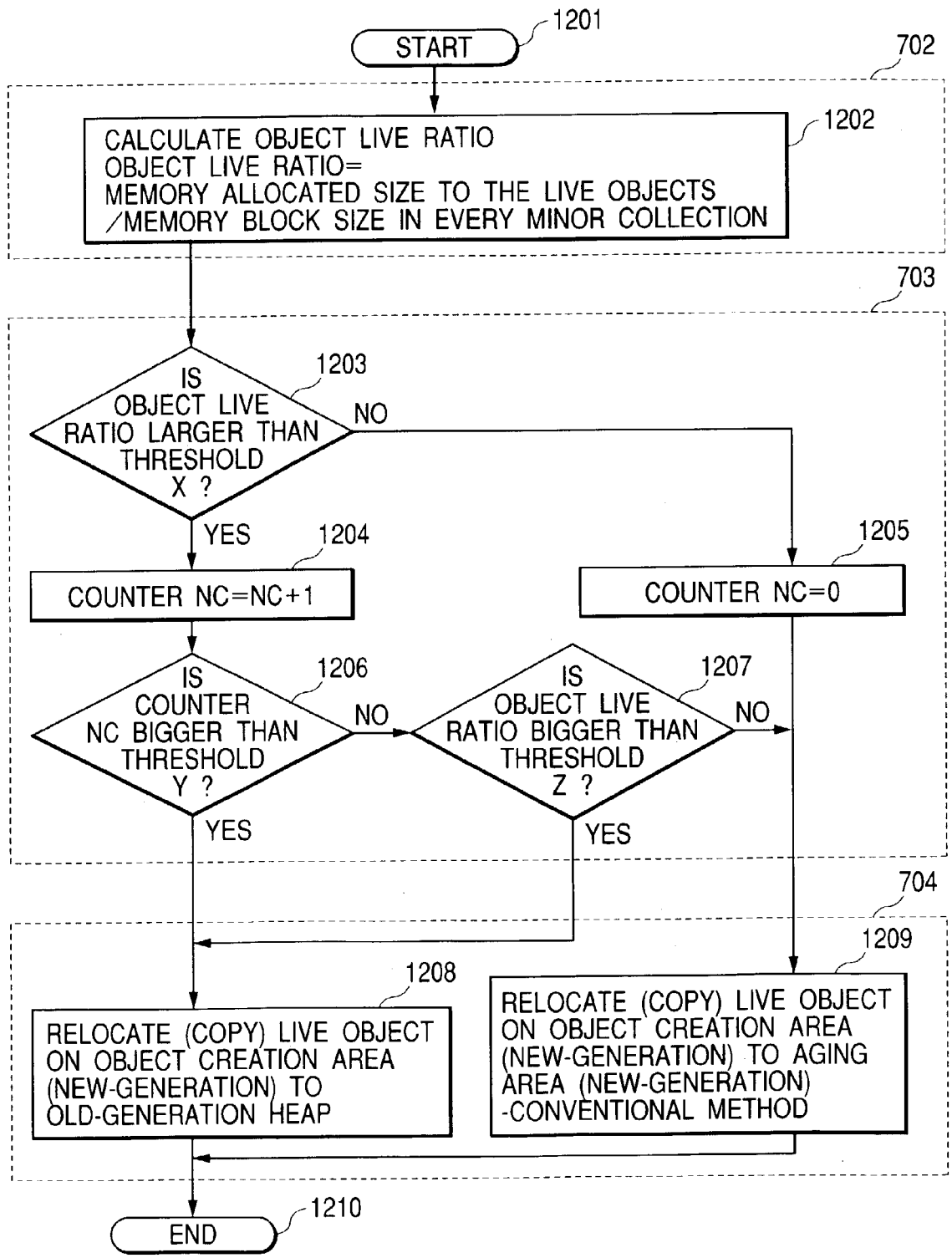

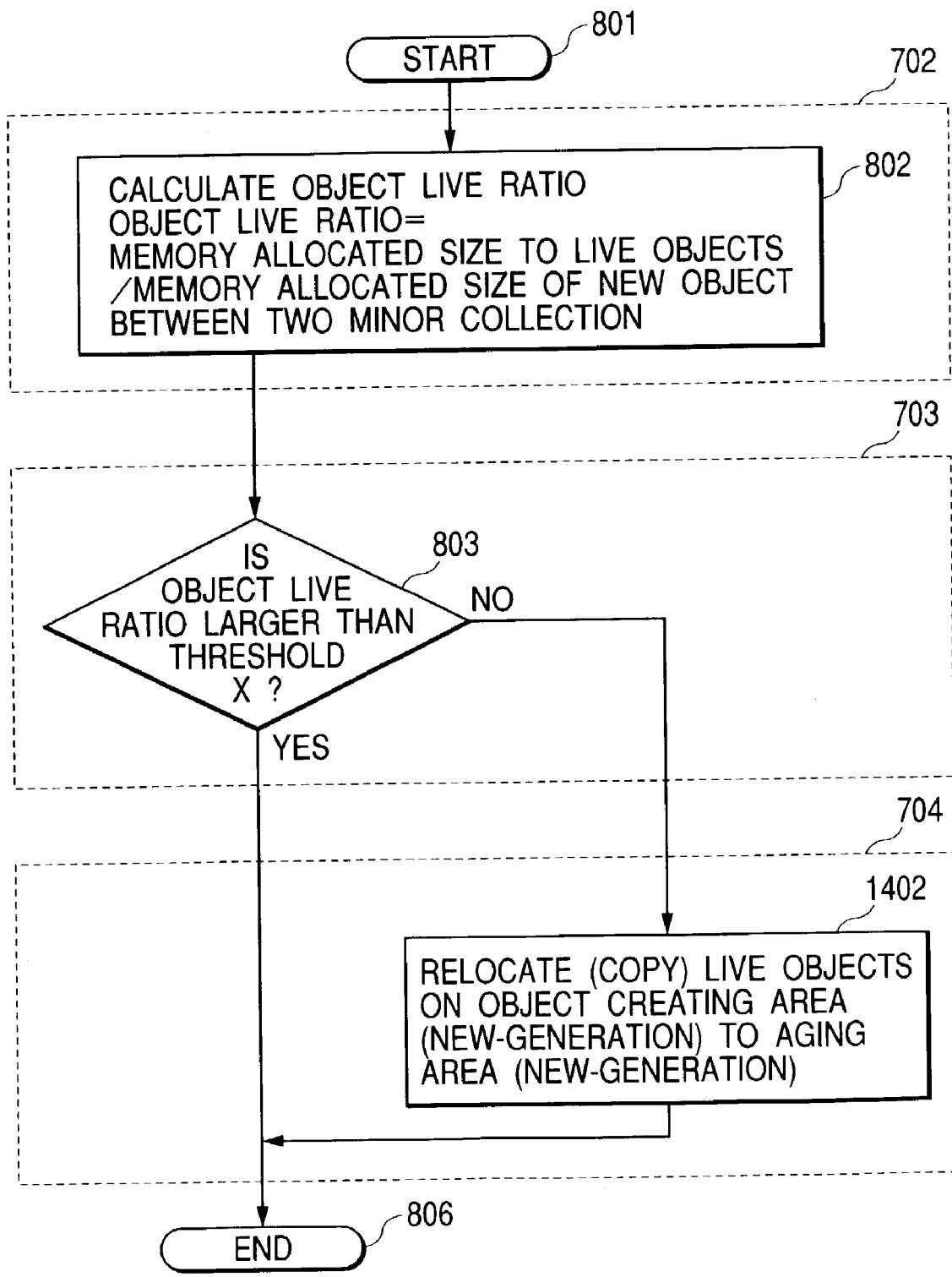

METHOD FOR HEAP MEMORY MANAGEMENT AND COMPUTER SYSTEM USING THE SAME METHOD

BACKGROUND OF THE INVENTION

1. Field of the Invention

The present invention relates to a computer system, and more particularly, to the field of a memory management method in the computer system. Specifically, the present invention relates to a generational garbage collection method and the computer system using the same method.

2. Description of the Prior Art

All the application programs are written using various resources. For example, in an object-oriented programming environment, a resource is handled as an object. A programmer reserves a memory explicitly for every object and initializes a memory block that corresponds to the object, then uses the object at program execution. After use, the programmer discards object status information and finally releases the memory to which the object is allocated. These memory management operations by programmers, however, are possible causes of bugs, and a fatal programming error, such as a memory leak and damage of an object remains to be a possibility.

An object-oriented programming system that has been used frequently in recent years to free a programmer from troublesomeness of memory management performs memory management automatically and dynamically. An object-oriented language processing system (programming system, hereinafter referred to as the system merely) manages a memory of a limited size called a heap and automatically and dynamically allocates an object to the heap. Because an object is allocated continuously by the system to the heap when an application program is executed, a limited heap will be exhausted someday. To solve this problem, a memory block not used in the heap has to be collected and reused by garbage collection.

Usually, in an object-oriented programming environment, when a pointer to an object in the heap (memory locating information) is lost, the object cannot be accessed. Therefore a memory block in the heap allocated to the inaccessible object can be reused for another object. Based on this fact, garbage collection identifies an accessible object during an application program is running and holds the object as a live object if the object can be accessed. An inaccessible object is released for subsequent heap allocation as an unnecessary object and the memory block is reused later.

Whether an object can be accessed or not is determined by tracing its root. All the application programs have roots. A root is a memory locating information list and refers to one of an object in a heap and an object (not referred to from an application program) for which a null in the heap is set. For example, all the global static object pointers in an application program, local variable and argument object pointers on a stack, and all the CPU registers that store a pointer that indicates the object in the heap are regarded as part of the root of the application program. Garbage collection determines that the object can be accessed by tracing the root if the object can be reached from the root.

Various garbage collection methods are proposed. Regarding these conventional methods, an explanation is omitted here because the details are described in the "Garbage Collection: Algorithms for Automatic Dynamic Memory Management" (ISBN 0-147-94148-4) written by Richard Jones and Rafael Lins and published by John Wiley & Sons. In this literature, an object-oriented programming system of recent years adopts generational garbage collection as a method for performing the garbage collection most efficiently.

The generational garbage collection is assumed that most objects live short, and the newer an object is, the shorter a period for existence is, but the older an object is, the longer even a period for existence is. Under this assumption, the time duration when application program execution is interrupted by the garbage collection is reduced by limiting the number of objects to be checked when the garbage collection is executed, that is, the size of a memory to which an object for the garbage collection is allocated.

The generational garbage collection divides a heap logically into multiple groups called a generation and manages it. The generation relates to a period for existence of an object and, in general, is decided depending on a garbage collection cycle in which the object lived. For example, when the heap is divided logically into two groups of a new generation and an old generation, the latest object is allocated in the memory block of a new-generation heap, and the object that lives even after the garbage collection was performed several times is copied to the memory block of an old-generation heap. Usually, the garbage collection is performed only for the new-generation heap (minor collection). Only when there is no memory block allocated to a new object in the new-generation heap, the garbage collection is performed for the heap including at least the old-generation heap (major collection). The minor collection is performed when the size of a memory to which a new object is allocated reaches a predetermined threshold or a predetermined time elapses during application program execution and performed more frequently than the major collection. The minor collection identifies an inaccessible object in an object group to which the memory block of the new-generation heap for the garbage collection is allocated by tracing its root and copies the accessible object to another place. Further, the minor collection copies an long-life object to the old-generation heap.

In general, copying indicates processing that copies an accessible object to another memory block. In order that an application program can access an object in a new location even after copy processing, the object pointer is moved to the memory block in the new location. In the minor collection, because the number of objects to be copied is very small in comparison with the major collection, the garbage collection can be performed in a short period.

FIG. 1 shows an example of a generational garbage collection system that divides a heap logically into two groups of an old generation and a new generation. In the drawing, 100 is a heap memory, 101 is an old-generation heap, and 102 is a new-generation heap. The new-generation heap 102 is further divided logically into an object creating area 110 and an aging area 111. Further, as shown in the drawing, the new-generation heap also includes an area that is not used yet. 120, 130, and 140 are objects allocated in the heap, and indicate the same contents in the drawing.

A new object is allocated to the object creating area 110. The object that lived as a result of having performed the minor collection in the object creating area 110 is copied to the aging area 111. The live object that was able to be accessed even after a fixed garbage collection cycle in the aging area 111 is relocated to the old-generation heap 101.

The new object 120 is allocated to the object creating area 110. As a result of the minor collection in the object creating area 110, if the object 120 can be accessed from an application program, the object 120 is copied as the object 130 of the aging area 111 and a pointer is updated. As a result of copying, the object 120 in the object creating area 110 is invalid and the object 130 is referred to from the application program. If the object 130 in the aging area 111 can be accessed even after a fixed garbage collection cycle, the object 130 is relocated as the object 140 in the old-generation heap 101. After the relocation, the object 140 is referred to from the application program.

FIG. 2 shows another example of a generational garbage collection system that divides a heap logically into three generations. In the drawing, 200 indicates a heap, 201 indicates a zeroth generation heap, 202 indicates a first generation heap, and 203 indicates a second generation heap. 210, 211, and 212 indicate objects and include the same contents. A new object is allocated to the zeroth heap 201. The object that lived during at least an N (N is an integer of 1 to 4) garbage collection cycle in the zeroth generation heap is relocated to the first generation heap 202 copies. The second generation heap 203 holds the oldest object in the system. The object that lived during at least an N (N is an integer of 1 to 4) garbage collection cycle in the first generation heap 202 is relocated to the second generation heap. Usually, N is set to 1.

The new object 210 is allocated to the zeroth generation heap 201. After a fixed garbage collection cycle, if the object 210 in the zeroth generation heap can be accessed from an application program, the object 210 is copied as the object 211 of the first generation heap 202. As a result of coping, the object 210 in the object creating area 201 becomes invalid and the object 211 is referred to from the application program. If the object 211 in the first generation heap 202 can be accessed even after the fixed garbage collection cycle, the object 211 is copied as the object 212 in the second generation heap 203. After the copying, the object 212 is referred to from the application program.

Regarding the aforementioned generational garbage collection method, the following conventional examples are well known.

For example, in U.S. Pat. No. 6,199,075, a method of performing generational garbage collection in a multiprocessor environment is described. When a specific processor detects a condition under which the generational garbage collection is performed to perform the garbage collection in the multiprocessor environment and the condition is taken, multiple processors stop program processing in accordance with an instruction of the specific processor and perform the generational garbage collection simultaneously. When the multiple processors detect that the garbage collection terminated, program processing is resumed. The generational garbage collection uses a method of dividing the heap shown in FIG. 1 into two groups of anew generation and an old generation and further dividing the new generation into an object creating area and an aging area. At minor collection, whether or not each object in the object creating area can be accessed from an application program is identified and the live object in the object creating area that was accessible is copied to the aging area. The object in the aging area that can be accessed even after an N (N is an integer of 1 to 4) garbage collection cycle is copied to the old-generation heap. (First well-known example) In U.S. Pat. No. 5,652,883, a method of accurately identifying an object that lives at minor collection by merging a generational garbage collection method and a conservative garbage collection approach is described. A memory includes a stack and a heap. The heap is divided logically into a new generation and an old generation, and new and old objects identified by a pointer are allocated to each generation. The stack holds what may be an object pointer in the entry.

What may be the object pointer is held indicates the following reason. For example, an object is defined as a union with an object reference and a value. In this case, the contents may be the pointer and the value when the object is referred to. In the conservative garbage collection, it is identified that both the pointer and value can be accessed. As a result, when the object that lived at garbage collection is compressed and relocated to another memory area, an object which is not a pointer cannot be moved because an address is not identified. Accordingly, the conventional method described here uses a method for accurately determining whether the pointer can be accessed or not and solving a problem by managing the pointer independently of what may be the pointer.

Further, a remember list is provided to support the object reference of a new-generation heap from an old-generation heap that cannot be traced from the root of the new-generation heap. The object in the old-generation heap having the pointer to the object in the new-generation heap is registered in the remember list. At garbage collection, the object that can be accessed via a stack and the remember list is identified as a live object. This method identifies the live object more accurately by determining at garbage collection whether an object for the garbage collection can be accessed or not using a stack entry and the remember list as well as using the root of the new-generation heap. Minor collection relocates the live object identified by the aforementioned method to an older generation. (Second well-known example)

In U.S. Pat. No. 6,226,653 B1, a generational garbage collection method that makes a reference from the object in the old-generation heap to the object of the new-generation heap efficiently using a remember set is described. In this literature, a method of dividing the heap shown in FIG. 2 logically into three generations is used. The remember set is used to register the old-generation heap having the pointer into the new-generation object in the same example as the second well-known example. Once an object is copied to the old-generation heap, even if an application program does not access the object, because the object is not collected until major collection is executed, the old-generation heap cannot be used effectively. Accordingly, to reduce the number of objects copied to the old-generation heap as much as possible, an intermediate generation located between the new generation and the old generation is provided and the copy timing between the respective generations is delayed, then the number of objects copied to the old generation is reduced. (Third well-known example)

As a method of reducing overheads of the minor collection, in the "Generational Garbage Collection Based on a Theoretical Analysis on an Object Live Ratio" of the Proceedings of the Information Processing Society of Japan Vol. 38 No. Apr. 4, 1997, pp. 835 to 844, a generational garbage collection method that dynamically changes a threshold called a watermark based on an object live ratio in the minor collection is disclosed. In this literature, a method of dividing a heap logically into two groups of a new generation and an old generation and further dividing the new-generation into an object creating area and an aging generation is used. By setting a threshold address called the watermark, an object that can be accessed in a lower address than the threshold at minor collection is copied directly to the old-generation heap and the object that can be accessed in a higher address than the threshold is copied to the aging area of the new-generation heap. In this literature, the system is dynamically set based on a theoretical calculation as to how long the object outlives the watermark. (Fourth well-known example)

In the generational garbage collection methods described in the aforementioned first, second, and third well-known examples, it is assumed that periods for existence of most objects are short, and the newer an object is, the shorter a period for existence is, but the older an object is, the longer even a period for existence is. In other words, in minor collection, it is assumed that there are only a few live objects to be relocated (copied), and, as a result, there are also few objects to be copied to the old-generation heap. Under the assumption, a method for accurately identifying a live object to be copied in the minor collection is described.

In a business information system of the broadband age, however, many application programs need to be developed in a short time. Therefore the tuning time of an individual application program is reduced. Further, when a new application program starts running on the business information system, the, application program seldom changes because it is difficult to stop the operation and maintain the system. In the program developed under such a condition, the period for existence of an object is prolonged. Further, in the business information system of the broadband age, because the application program is accessed via a network, the live period of the object is prolonged intrinsically. In the program in which the live period of an object is long, there are many live objects identified to be accessible as a result of minor collection and an amount of relocation of an intra- or inter-generation object, that is, an amount of copying increases.

For example, in the generational garbage collection composed of the zeroth, first, and second generations as shown in the aforementioned third well-known example, when there are many live objects, most new objects for minor collection are copied from the zeroth generation to the first generation, and further these objects are copied from the first generation to the second generation as they are. Otherwise, as shown in the aforementioned first well-known example, in the generational garbage collection composed of new and old two generations and in which the new generation is further composed of an object creating area and an aging area, most objects are copied from the object creating area to the aging area at minor collection and further copied from the aging area to an old-generation area. That is, great many objects perform relocation processing (copy processing) twice or more. Because the interrupt time of the application program in the minor collection is minimized in particular, the copy processing may be performed in parallel with the application program processing. In such a case, the copy processing that occurs by relocation adversely affects the processing of the application program and the performance of the application program deteriorates greatly. In the aforementioned first, second, and third well-known examples, because it is assumed that there Are few live objects at minor collection, the copy processing hardly affects the application program processing. In the application program of the broadband age having many live objects, the inter-generation copy processing of an object increases, and, consequently, the performance of the application program deteriorates.

The fourth well-known example is described below. In a prior art, it is assumed that garbage collection processing is performed by interrupting program processing. Under the assumption, based on a theoretical calculation indicating that how long an object outlives, the optimum value of a watermark is decided and overheads of the garbage collection are reduced. In reality, however, to minimize a program interrupt time by the garbage collection processing, the copy processing part of the garbage collection processing may be performed in parallel with the program processing. In this prior art, because the deterioration of the processing performance of the application program caused by the fact that the copy processing is performed in parallel with the prime processing of the program is not taken into consideration, it is difficult to decide the optimum threshold. Further, to change a copy destination using a threshold address, even when most objects live in an object creating area, an object allocated to a higher address than the threshold address is copied to the aging area of the new-generation heap, and, therefore, an amount of copying cannot be reduced.

To solve this problem, when there are many accessible objects in the minor collection, that is, when the block size of a memory to be copied is large, the copy processing needs to be reduced by changing a copy destination of an object.

Further, a measure can be taken for the problem of the performance deterioration of an application program by tuning a source code level, such as redesigning the application program, releasing an unnecessary object or not generating an unnecessary object, or reusing the object. However, the source code level, tuning increases a program development cost.

To solve this problem, even when there are many accessible live objects at minor collection, the processing time of an application program needs to be reduced without changing the application program.

In order to prevent the performance deterioration of the application program of the broadband age, a first issue of the present invention is, when there are many accessible live objects from the application program in the minor collection of generational garbage collection, to provide a generational garbage collection method that reduces the relocation processing (that is, copy processing) of the objects.

A second issue of the present invention is to provide a parameter setting method of the generational garbage collection by which a programmer can set a threshold for changing a copy destination of an object without modifying a source code of the application program.

SUMMARY OF THE INVENTION

A first issue of the present invention can be solved by performing a live object copy process in the minor collection of generational garbage collection through a calculate process of object live ratio that calculates a ratio of the size of a memory allocated to an object that lives in a new object to the size of the memory requested and allocated to the system for the new object generated by an application program during at least two times of minor collection, a compare process of object live ratio that compares an object live ratio with a threshold, and a live object copy process that copies a live object directly to an old-generation heap when the object live ratio exceeds the threshold.

A second issue of the present invention can be solved by allowing an application programmer to provide means that set a threshold for changing a copy destination as a runtime parameter of a program in addition to a means that solves the first issue.

New computer systems disclosed in the present invention are listed as follows:

1) A computer system that includes a heap memory, wherein the computer system has means that set a threshold for changing a copy destination of a live object, means that hold the threshold, and a generational garbage collector that changes the copy destination of the live object in accordance of an object live ratio and the threshold.

2) A computer system that manages a heap memory of an object which includes
    means that allocate the object to the heap memory, and
    a generational garbage collector that collects the object from the heap memory,
    wherein the generational garbage collector changes a copy destination of a live object in accordance with an object live ratio.

3) A computer system that manages a heap memory of an object which includes
    means that allocate the object to the heap memory, and a generational garbage collector that collects the object from the heap memory,
    wherein the generational garbage collector includes
    means that calculate an object live ratio,
    means that compare the object live ratio with a threshold, and
    means that change a copy destination of a live object in accordance with a comparison result.

4) The computer system according to the aforementioned 3), wherein
    the computer system divides the heap memory logically into at least new and old two generations and manages it,
    the generational garbage collector includes minor collection that performs garbage collection for a new-generation heap and major collection that performs garbage collection for the whole heap, and
    the minor collection copies a live object directly to an old-generation heap when the object live ratio exceeds the threshold.

5) The computer system according to the aforementioned 3) or 4), wherein the threshold is set as a runtime parameter.

BRIEF DESCRIPTION OF THE DRAWINGS

FIG. 11 shows a detailed flow of the live object copy process that uses the threshold of the object live ratio and a threshold of a counter in a modification example 1 of the embodiment of the present invention.

FIG. 12 shows a detailed flow of the live object copy process in a modification example 2 of the embodiment of the present invention.

FIG. 14 shows a detailed flow of the live object copy process that uses the threshold of the object live ratio in a modification example 4 of the embodiment of the present invention.

DETAILED DESCRIPTION OF PREFERRED EMBODIMENTS

Memory management methods related to the present invention are described below in detail with reference to the drawings.

Figure 3:
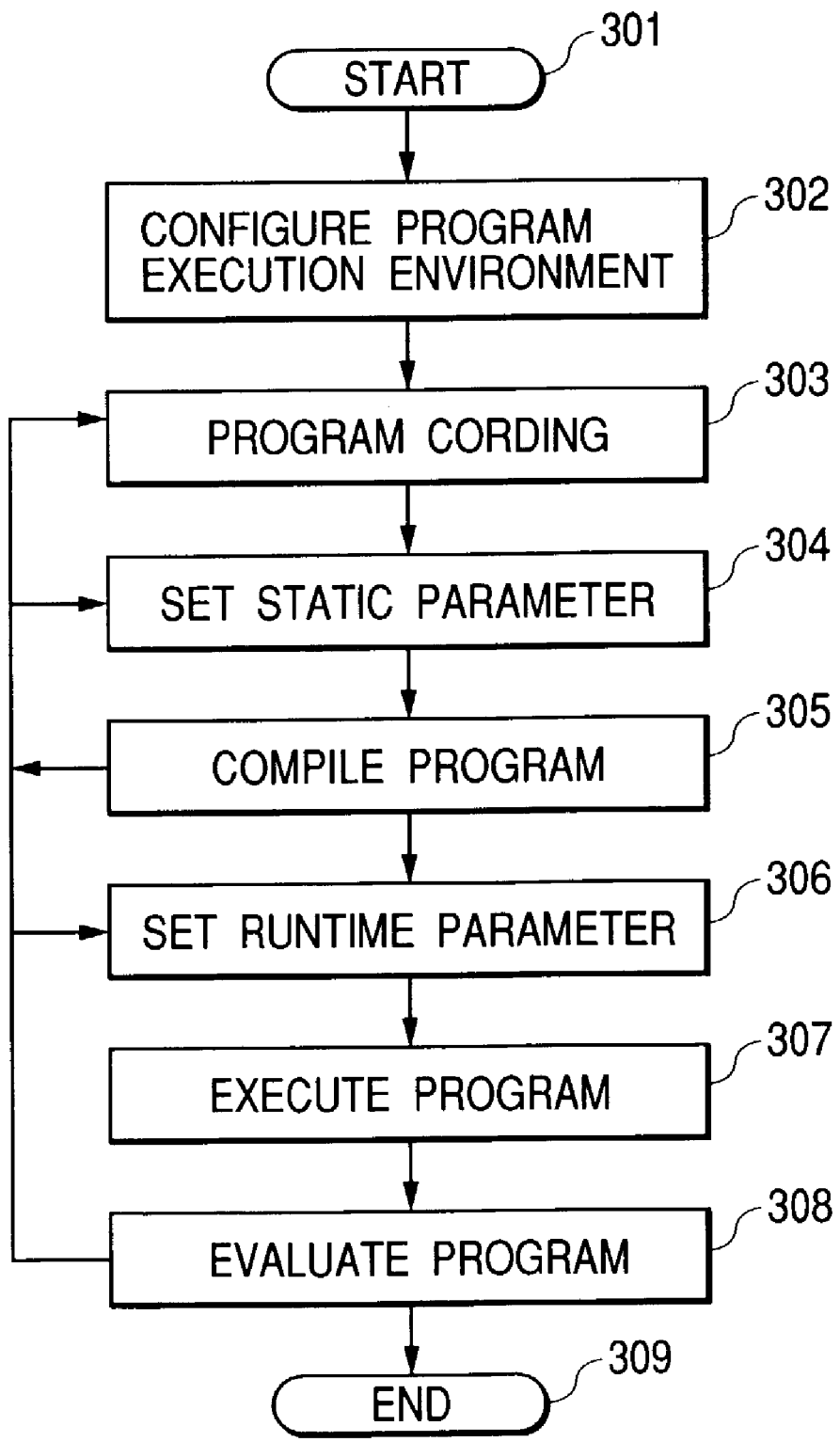
FIG. 3 shows a program development flow by a programmer in an embodiment of the present invention.

FIG. 3 shows a development flow of an application program in an embodiment of the present invention. The application program is developed in the order of configuring a program execution environment (step 302), program coding (step 303), setting of a static parameter (step 304), compiling a program (step 305), setting of a runtime parameter (step 306), executing a program (step 307), and evaluating a program (step 308). The step 302 is executed only once before multiple application programs are encoded. A programmer repeats the processing of the step 303, step 304, and step 305 until a binary program is completed. After a binary program is completed, the processing of the step 306 and subsequent steps can be executed. If processing performance is not sufficient as a result of executing a program and estimating the program in the step 308, however, processing returns to the step 306 or the step 304 and tuning is performed by resetting various parameters. When the processing performance does not improve even if the tuning is performed in the step 306 or step 304, processing returns to the step 303 and the program is recoded. In the step 307 of the program execution, the program is executed using a memory resource of a computer system. In the embodiment of the present invention, however, it is assumed that the programmer does not manage a memory, but the system manages a heap memory. Further, in heap memory management, generational garbage collection is used.

Figure 4:
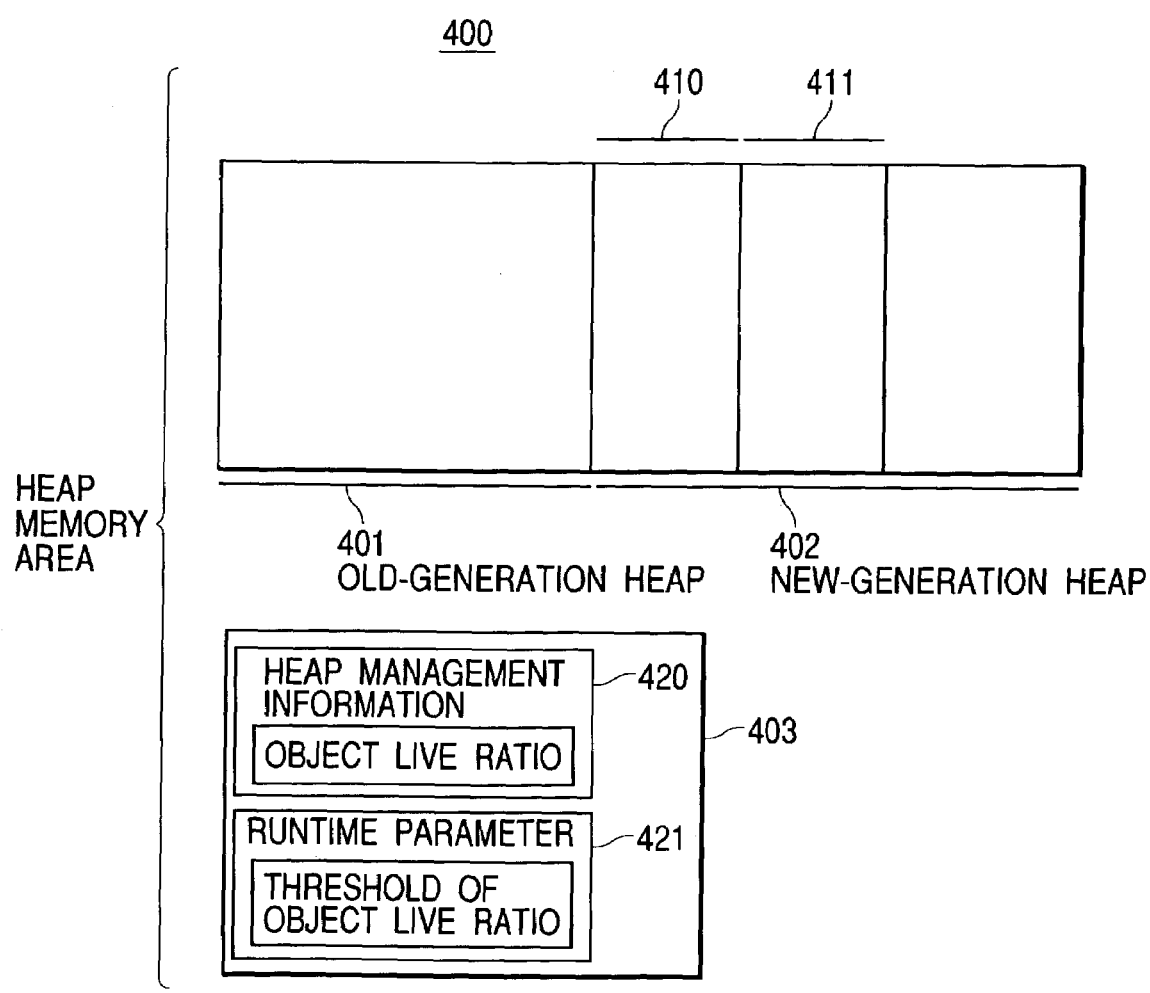
FIG. 4 shows a schematic configuration of the heap memory in the embodiment of the present invention.

FIG. 4 shows a schematic configuration of a heap memory that performs generational garbage collection in an embodiment of the present invention. A heap memory 400 is provided with an old-generation heap 401 and a new-generation heap 402. These two heaps are divided logically. Further, the heap memory 400 has a management area 403. The new-generation heap 402 is provided with an object creating area 410 and an aging area 411 in which the latest object is held. A new object is allocated to the object creating area 410. The object that lives in the object creating area 410 is copied to the aging area 411. A live object in the aging area 411 is copied to the old-generation heap 401.

Figure 1:
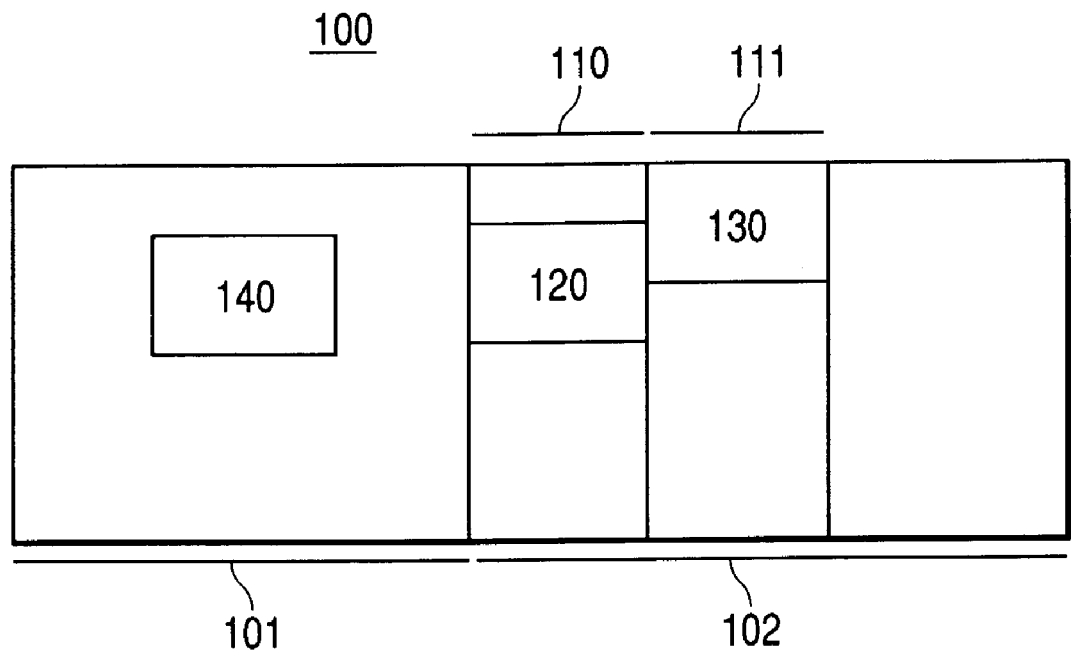
FIG. 1 shows a schematic configuration 1 of a heap memory for generational garbage collection in a prior art of the present invention.
Figure 2:
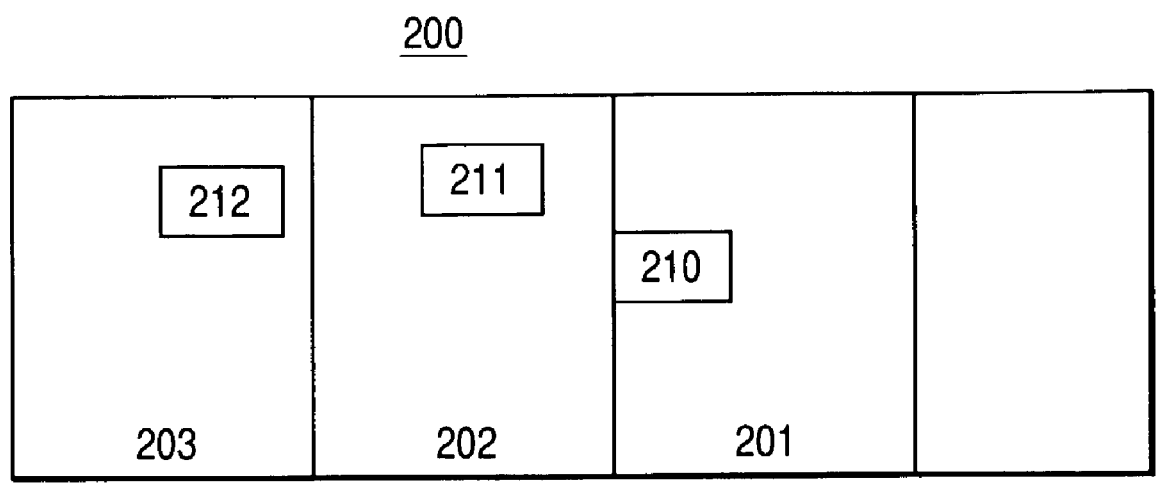
FIG. 2 shows a schematic configuration 2 of the heap memory for the generational garbage collection in the prior art of the present invention.

The management area 403 manages heap management information 420 and a run time parameter 421. The heap management information 420 has various necessary management information with which the system manages heap memory. The run time parameter 421 is set by a programmer at program execution. Specifically, the runtime parameter is a heap memory size or a new-generation heap size when program execution starts. At this point, an area in which the heap memory management and the runtime parameter are managed is provided in another area apart from a generational heap, but may also be provided in the generational heap. In the embodiment of the present invention, a garbage collection method in which the heap is divided logically into two generations is described, but the method can also apply to the heap divided logically into three generations as shown in FIG. 2. If the heap is divided logically into the three generations such as a zeroth generation, a first generation, and a second generation, the zeroth generation corresponds to the object creating area 410, the first generation corresponds to the aging area 411, and the second generation corresponds to the old-generation heap 401.

Because the configuration of the heap memory 400 and management information management method shown in FIG. 4 can be implemented in the same method as a prior art, a detailed explanation is omitted. In the embodiment of the present invention, the management area 403 records an object live ratio in addition to the conventional heap management information, and a programmer sets a threshold of the object live ratio as a runtime parameter. Further, the set threshold is held in the runtime parameter 421 of the management area 403.

Figure 5:
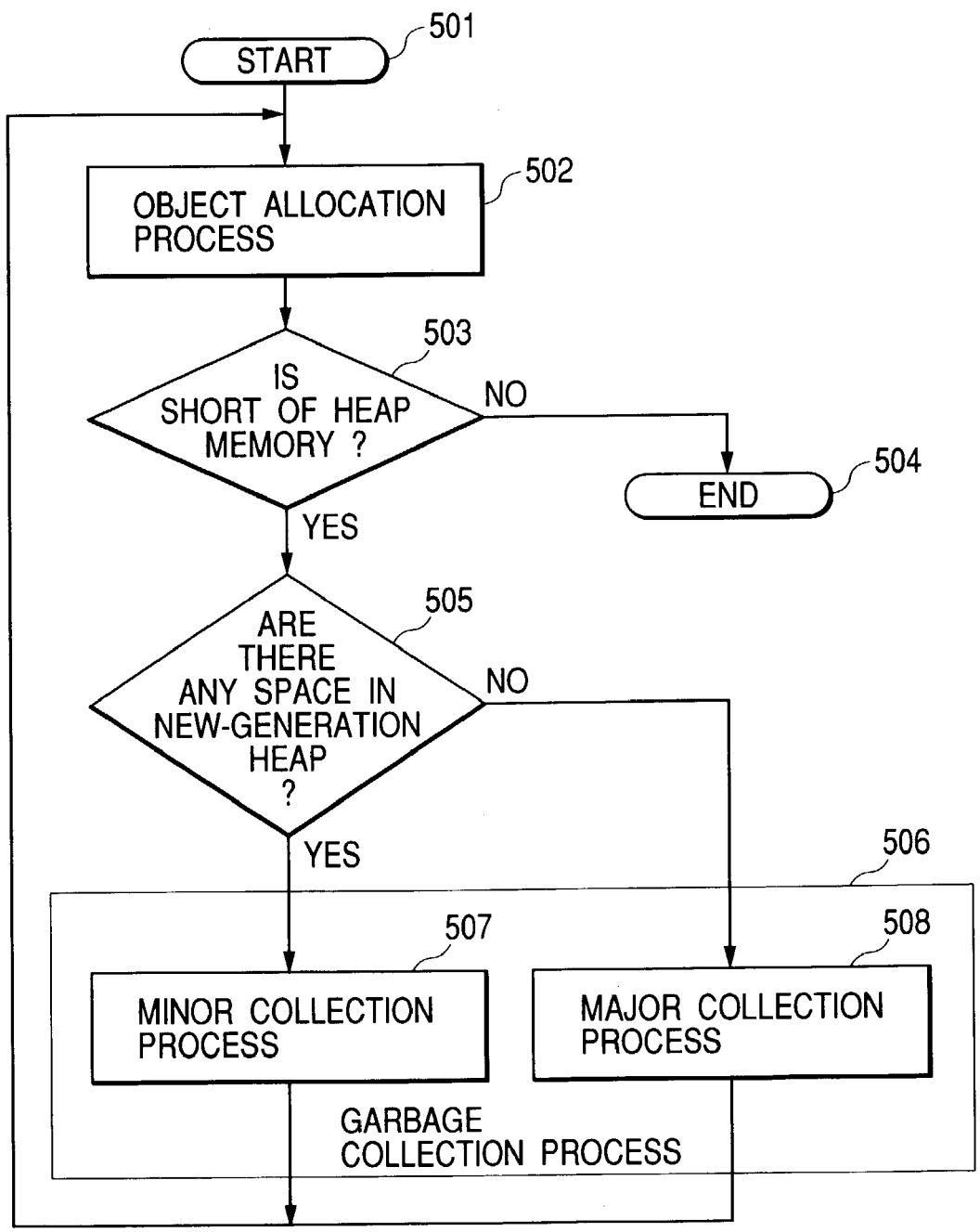
FIG. 5 shows a processing flow of a heap memory management process in the embodiment of the present invention.

Subsequently, FIG. 5 shows a heap memory management process that manages the heap memory 400 of FIG. 4. The heap memory management process is provided with an object allocation process 502 and a garbage collection process 506. The garbage collection process 506 has a minor collection process 507 and a major collection process 508. When an application program issues a memory allocation request to the system to generate a new object at application program execution, the system activates the heap memory management process (501). Subsequently, the object allocation process 502 allocates the new object to an empty memory block in a heap. Because the object allocation process 502 can be implemented in the same method as a prior art, a detailed explanation is omitted here.

In a process 503, when a memory block is allocated to a new object, whether a heap memory is full or not is determined. When the heap memory has a space, the memory block is allocated to the new object and the heap memory management process terminates (504). When the heap memory has not space in the process 503, the garbage collection process 506 is activated. At this point, a program part that executes the garbage collection process 506 is also called a garbage collector.

When the garbage collection process 506 is activated, whether there is a space in a new-generation heap or not is determined through the process 505. When there is the space in the new-generation heap, the minor collection process 507 is activated. If there is no space in the new-generation heap, the major collection process 508 is activated.

The minor collection process 507 is activated when a new object allocated to a new-generation heap reaches a fixed memory size or a fixed period of time elapses after the garbage collection process 506 is executed. In the minor collection process 507, regarding a new object group allocated to a memory block for the garbage collection of the new-generation heap, an application program identifies an accessible object and moves an accessible live object to another generation, then releases the memory block allocated to an inaccessible object.

Regarding at least an old-generation object allocated to a heap memory as well as all the objects allocated to the heap memory in this example, the major collection process 508 checks whether they can be accessed from an application program, and releases a memory block allocated to an inaccessible object. The major collection process 508 also compacts the heap memory so that a live object can be arranged in a collected memory block.

A memory block is released through the minor collection process 507 or major collection process 508. After release, through the object allocation process 502, the memory block is reallocated to a new object and the heap memory management process terminates (504).

The embodiment of the present invention differs from a prior art in the processing flow of the minor collection process 507.

Figure 6:
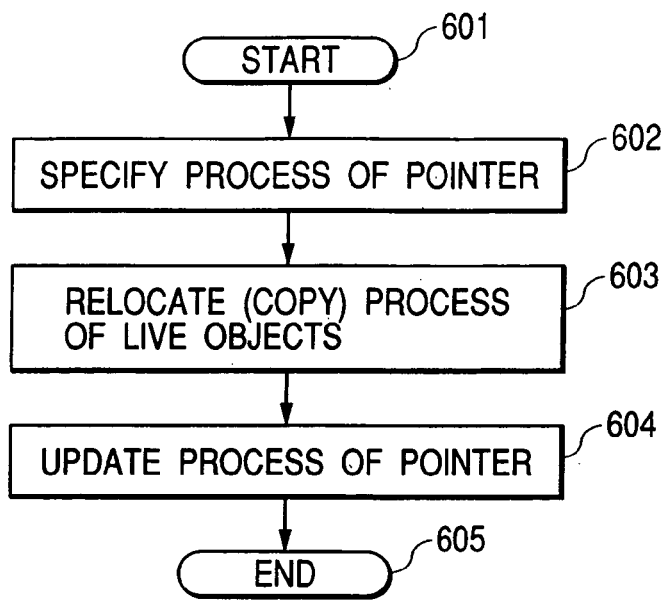
FIG. 6 shows a processing flow of a minor collection process in the embodiment of the present invention.

FIG. 6 shows a processing flow of the minor collection process 507. The minor collection process 507 is implemented through a pointer location specify process 602, a live object copy process 603, and a pointer location update process 604.

The pointer location specify process 602 specifies a pointer for an accessible object from an application program when the minor collection process 507 is activated.

The live object copy process 603 copies an object that lives as a result of minor collection to a memory block of a different generation or a different memory block of the same generation.

The pointer location update process 604 updates the pointer of the copied live object so that an application program can access the copied live object.

In the embodiment of the present invention, the live object copy process 603 in minor collection is new. Because the pointer location specify process 602 and the pointer location update process 604 can be implemented using a prior art, a detailed explanation is omitted here.

Figure 7:
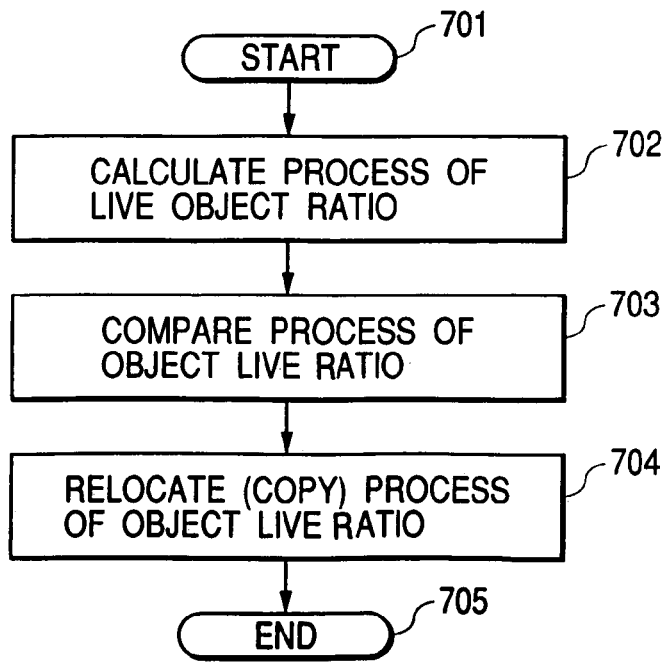
FIG. 7 shows a schematic flow of a live object copy process for the minor collection process in the embodiment of the present invention.

FIG. 7 shows a processing flow of the live object copy process 603 in the minor collection process. The live object copy process 603 is provided with a calculate process 702 of object live ratio, a compare process 703 of object live ratio, and a live object copy process 704.

The calculate process 702 of object live ratio calculates an object live ratio. The compare process 703 of object live ratio determines whether the object live ratio calculated in the calculate process 702 of object live ratio is high or not. The live object copy process 704 changes a copy destination of a live object in accordance with a result of the compare process 703 of object live ratio.

In the embodiment of the present invention, the live object copy process 603 in minor collection is provided with the calculate process 702 of object live ratio, the compare process 703 of object live ratio, and the live object copy process 704. Further, the live object copy process 704 operates in accordance with an execution result of the compare process 703 of object live ratio.

Figure 8:
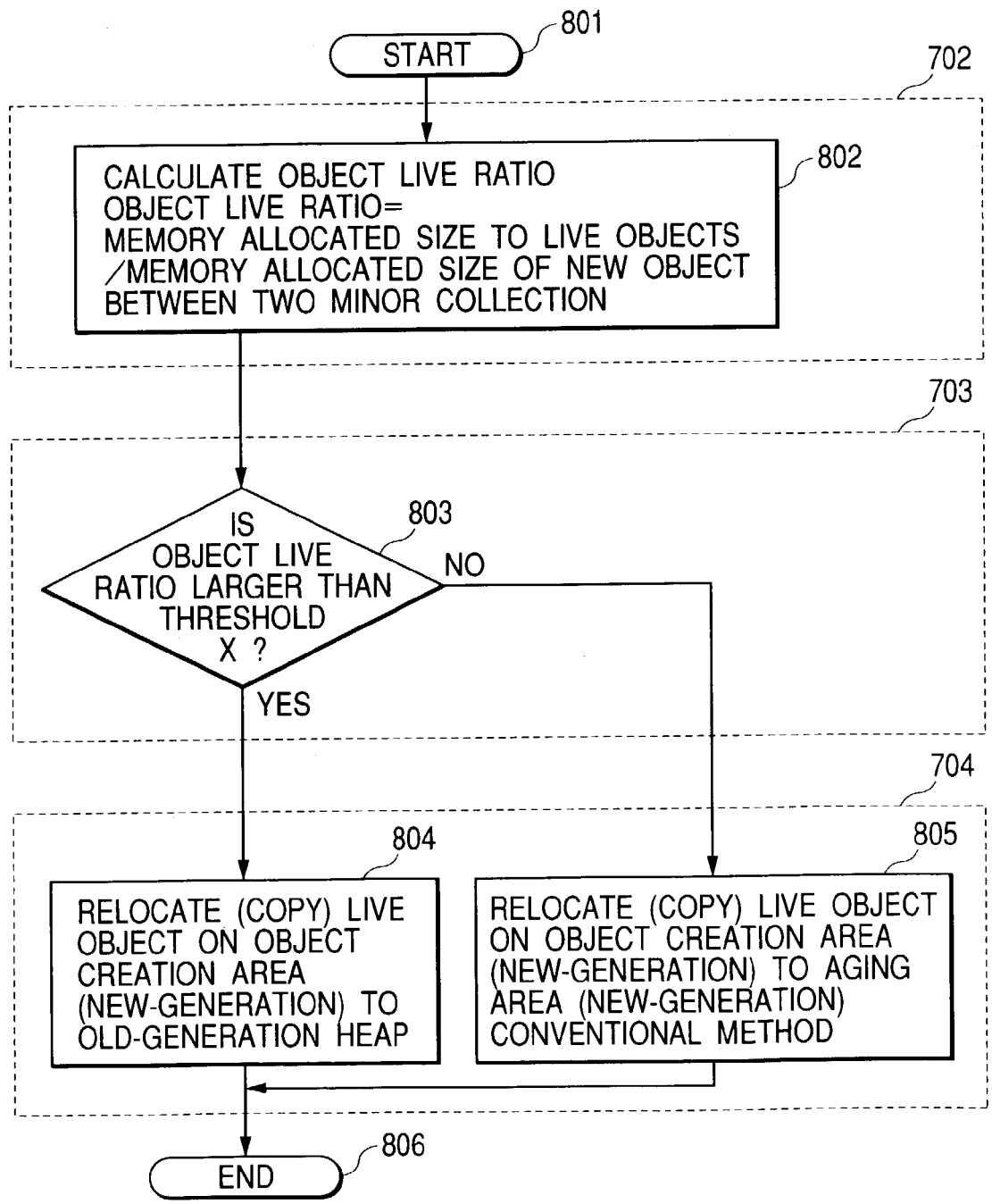
FIG. 8 shows a detailed flow of the live object copy process that uses a threshold of an object live ratio in the embodiment of the present invention.

FIG. 8 shows a detailed processing flow of the live object copy process 603. The live object copy process 603 is provided with a process 802 that calculates an object live ratio, a process 803 that determines whether the object live ratio exceeds a threshold or not, a process 804 that copies a live object directly from the object creating area 410 of the new-generation heap 402 to the old-generation heap 401 when the object live ratio exceeds the threshold, and a process 805 that copies the live object of the object creating area 410 of the new-generation heap to the aging area 411 of the new-generation heap 402 using the same method as a prior art when the object live ratio is below the threshold.

The process 802 calculates an object live ratio. The object live ratio is a ratio of the size of a new-generation heap memory to which a new object is allocated during minor collection to the size of the memory to which live objects of new objects are allocated. If the minor collection process 507 is activated every time a memory allocated to the new object reaches a fixed size, the memory size allocated to the new object that corresponds to a denominator of the object live ratio is fixed. On the other hand, when the minor collection process is activated at a certain interval, the memory size that corresponds to the denominator of the object live ratio may vary with the contents of program processing. The object live ratio calculated in the process 802 is recorded in the management area 403 shown in FIG. 4. Because an object live ratio is used only in the minor collection process being processed currently, it may also be recorded in a temporary area.

A programmer sets a threshold X used in the process 803 as a runtime parameter through the runtime parameter setting step 306 in the program development flow shown in FIG. 3. When the program execution starts, these runtime parameters are recorded in the management area 403 of the heap memory 400 shown in FIG. 4. In the process 803, an object live ratio that is calculated newly per minor collection is compared with a predetermined threshold through the process 802.

In the embodiment of the present invention, an object live ratio is calculated as a ratio of the memory size of a new-generation heap memory to which new objects are allocated during minor collection to the memory size to which live objects in the new objects are allocated. The object live ratio may also be the size of a memory to which a live object is allocated or the number of live objects. Similarly, a threshold is set as a ratio in the same manner as the object live ratio, but the threshold may also be the memory size to which the live object is allocated or the number of live objects. Further, in the embodiment of the present invention, an object live ratio is calculated currently based on the information about a live object regarding a heap memory for minor collection, but the object live ratio may also be calculated based on a past history. In that case, even if the calculate process 702 of object live ratio is not performed in the live object copy process 603, a live object may be copied based on the object live ratio recorded in the management area 403 of a heap memory.

In the embodiment of the present invention, the live object copy process 603 in minor collection performs the processing of the process 804 or process 805 in accordance with a determination result through the process 802 that calculates an object live ratio and the process 803 that determines whether the object live ratio exceeds a threshold or not and changes a copy destination of a live object.

Further, in the embodiment of the present invention, the object live ratio calculated in the process 802 and the threshold used in the process 803 are held in the management area 403. Further, a programmer sets the threshold used in the process 803 as a runtime parameter of a program. Further, the programmer holds the threshold of the object live ratio set as the runtime parameter in the management area 403.

Figure 9:
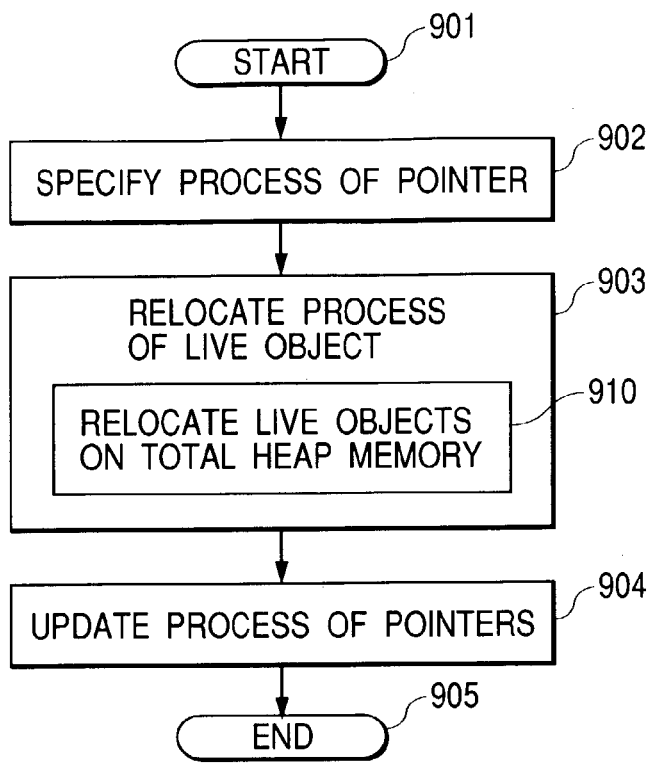
FIG. 9 shows the processing flow of a major process for the garbage collection process in the embodiment of the present invention.

FIG. 9 shows a processing flow of the major collection process 508 shown in FIG. 5. The major collection process 508 is implemented through a pointer location specify process 902, a live object copy process 903, and a pointer location update process 904.

The live object copy process 903 identifies an accessible object from an application program regarding the whole heap and copies the accessible live object through a process 910. Because the major collection process 508 can be implemented in the same method as a prior art, a detailed explanation is omitted here.

Subsequently, a processing flow of generational garbage collection in the embodiment of the present invention is explained with reference to each drawing.

FIG. 3 shows a flow of program development. When a programmer develops an application program, first, the program execution environment of step 302 is configured. Subsequently, an application program is coded (303) and a static parameter is set (304), then a program is compiled (305). When compilation terminates, the program is executed. Prior to the program execution, the programmer sets a runtime parameter. In the runtime parameter setting (306), a heap memory size and a new-generation heap size are set, and at the same time, a threshold of an object live ratio is set.

In the present invention, the programmer sets a threshold of an object live ratio in the runtime parameter setting.

Figure 10:
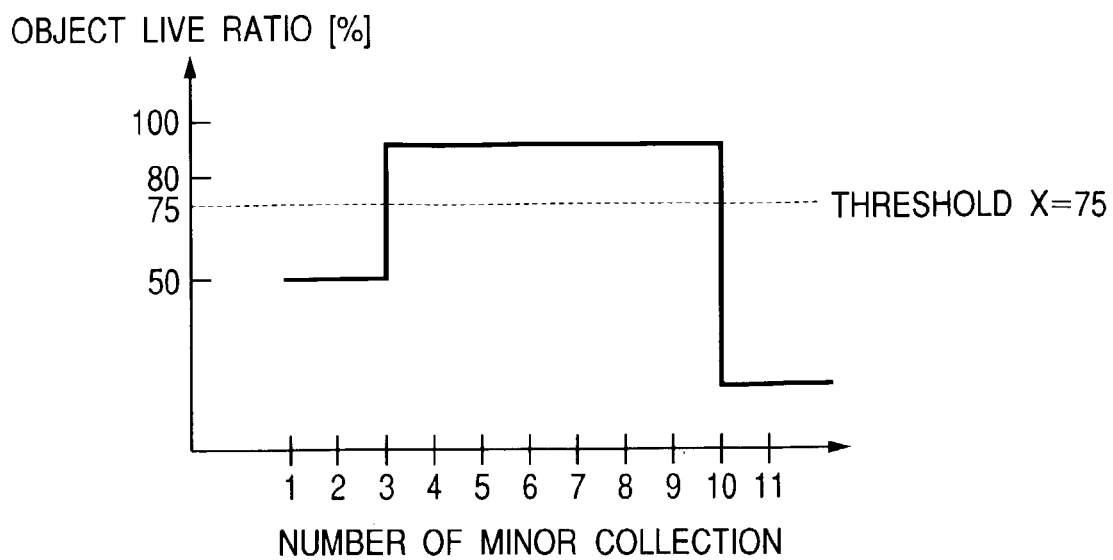
FIG. 10 is a drawing showing the number of minor collection times and a transition of the object live ratio at program execution in the embodiment of the present invention.

FIG. 10 shows an example of the number of minor collection times and a transition of an object live ratio at program execution. In the embodiment of the present invention, a programmer sets the threshold of the object live ratio to 75% as a runtime parameter. The programmer executes a program using the runtime parameter including the threshold through the step 307 shown in FIG. 3. When the program execution starts, the program processes using a heap memory of the system. When the program allocates a memory to a new object, a memory allocation request is issued to the system. When the system receives the memory allocation request from the program, a heap memory management process is activated and a memory block of a heap is allocated to the new object. FIG. 5 shows a processing flow of the heap memory management process. When the system activates the heap memory management process (501), the object allocation process 502 is performed.

The object allocation process 502 allocates a new object to the object creating area 410 of the new-generation heap 402 shown in FIG. 4. The object creating area 410 for allocating the new object becomes full according to the program processing, the system activates the garbage collection process 506 shown in FIG. 5. As a result of the process 505, because there is still space in the new-generation heap 402, the first minor collection process 507 is activated.

Subsequently, a processing flow of the minor collection process 507 is described with reference to FIG. 5, FIG. 6, and FIG. 8. As shown in FIG. 5, when the system activates the minor collection process 507, first, the pointer location specify process 602 is activated. The pointer location specify process 602 shown in FIG. 6 identifies whether the new object allocated to the object creating area 410 of the new-generation heap 402 can be accessed from an application program. Subsequently, the system activates the live object copy process 603. The live object copy process 603 calculates an object live ratio through the calculate process 802 of object live ratio shown in FIG. 8. The object live ratio is a ratio of an object that lives in a new object allocated to the object creating area 410 to the memory size of the object creating area 410. As shown in FIG. 10, because the object live ratio of the first minor collection is 50%, that is, half of the new object of the object creating area 410 can be accessed, the object live ratio is recorded in the management area 403 of FIG. 4.

Subsequently, the compare process 803 of object live ratio compares the object live ratio recorded in the management area 403 of FIG. 4 with the threshold of the object live ratio recorded in the management area 403 of the heap memory 400 shown in FIG. 4. Because the threshold of the object live ratio is set to 75% by a programmer when the program execution starts as shown in FIG. 10, the object live ratio is equal to or below the threshold in the first minor collection. Because the object live ratio is equal to or below the threshold, the comparison result is set for NO. Further, the live object of the object creating area 410 is copied to the aging area 411 in the same method as a prior art through the process 805. The live object copied to the aging area 411 is copied to the old-generation heap 401 after several minor collection cycles.

After the live object copy process 603 is executed, the pointer location of a live object is updated and the first minor collection process 507 terminates using the pointer location update process 604 shown in FIG. 6 so that an application program can access an object of a copy destination. Subsequently, the object is allocated to the heap through the process 502 and the heap memory management process terminates.

When the system responds to a memory allocation request from the program, a memory block is allocated to a new object and the program can perform the following processing. When the program reissues the memory allocation request to the system in the following processing, the system reactivates a heap memory management process and performs similar processing. The heap memory management process allocates a new object to a heap memory through the object allocation process 502. When a memory block to be allocated in the process 503 is insufficient, there is still space in the new-generation heap. Accordingly, the minor collection process 507 is activated in the same manner as the first minor collection. As shown in FIG. 10, even in the second minor collection, because the object live ratio is 50% while the threshold of the object live ratio is 75%, the live object copy process 603 copies the live object of the object creating area 410 to the aging area 411 through the process 805 shown in FIG. 8 in the same manner as a prior art and terminates the second minor collection.

Subsequently, when the program issues a memory allocation request to the system, the system reactivates a heap memory management process. The heap memory management process shown in FIG. 5 allocates a new object to the object creating area 411 through the object allocation process 502. The system activates the garbage collection process 506 when the object creating area 411 is full. Because there is still space in the new-generation heap, the third minor collection process 507 is activated. In the third minor collection process 507, first, a pointer location of a live object is specified through the pointer location specify process 602 shown in FIG. 6. Subsequently, the live object copy process 603 is performed.

The live object copy process 603 calculates an object live ratio in the object live ratio calculate process 802 shown in FIG. 8. As shown in FIG. 10, in the third minor collection, the object live ratio is 90%.

The object live ratio compare process 703 compares an object live ratio with a threshold X obtained in the process 802 through the process 803. The object live ratio is 90% and the threshold of the object live ratio is 75%. Accordingly, the comparison result is set for YES. Accordingly, in the process 804, the live object of the object creating area 410 is copied to the old-generation heap 401 instead of the adjacent aging area 411. The object copied to the old-generation area 401 is not copied until the major collection process 508 shown in FIG. 5 is activated. Subsequently, the pointer location of the object copied through the pointer location update process 604 shown in FIG. 6 is updated and the minor collection process 507 terminates, then the heap memory management process terminates. As the processing of the program advances as shown in FIG. 10, the minor collection process 507 is activated in multiple times. In the third to tenth minor collection, however, because the object live ratio continuously exceeds the threshold, the live object copy process 704 shown in FIG. 8 directly copies the live object of the object creating area 410 to the old-generation heap 401 through the process 804. In the eleventh minor collection, an object live ratio is lower than a threshold. The comparison result of the process 803 shown in FIG. 8 is set for NO, the live object of the object creating area 410 is copied to the adjacent aging area 411 through the process 805 of the live object copy process 704. The object copied to the aging area 411 is copied to the old-generation heap 401 after several minor collection cycles using the same method as a prior art.

According to the embodiment of the present invention, when minor collection is performed in a heap memory management method using generational garbage collection, if a live object ratio is high, copy processing generated by the object copy to an old-generation heap from an aging area that causes a problem for many live objects can be reduced by copying the live object directly from the object creating area for the minor collection to the old-generation heap. Further, because the programmer can set a condition for copying the live object directly to the old-generation heap as a runtime parameter, the optimum threshold can be set for the program even if a source program is reencoded. Simultaneously, a program development cost can be reduced and the program processing time can be reduced. The aforementioned is the embodiment according to the present invention.

MODIFICATION EXAMPLE 1 OF EMBODIMENT

A modification example of the present invention decides a copy destination of a live object in accordance with a counter as well as an object live ratio in the compare process 703 of object live ratio of FIG. 7.

The counter records the number of times in which an object live ratio exceeds a threshold over more than one minor collection time. Further, only when the object live ratio exceeds the threshold continuously several times, the threshold of the counter is set so that a copy destination of a live object can be changed. The counter and the threshold of the counter NC are held in the management area 403 of the heap memory 400 of FIG. 4 respectively. The threshold of the counter NC can be set as a runtime parameter at program execution. Further, the counter NC is initialized at 0. Further, when the programmer does not set a threshold of the counter, the threshold is set to 0 previously.

The modification example 1 uses a generation heap in which the heap memory shown in FIG. 2 is divided logically into three generations. The system divides the heap memory into three generations of the zeroth, first, and second generations and manages it. The zeroth generation heap allocates the latest object corresponding to the object creating area 410 of FIG. 4. The first generation heap corresponds to the aging area 411 of FIG. 4 and copies an object that lived in the zeroth generation heap. The second generation heap corresponds to an old-generation heap and allocates the oldest object. Minor collection is usually performed to the zeroth generation heap, but it is not performed to the second generation heap.

FIG. 11 shows a detailed flow of the live object copy process 603 in the minor collection process 507. The live object copy process 603 of FIG. 6 first calculates an object live ratio in a process 1102. The object live ratio is calculated in the same method as the calculate process 802 of object live ratio shown in FIG. 8. Subsequently, a process 1103 compares an object live ratio with a threshold X of the object live ratio. When the object live ratio exceeds the threshold X, 1 is added to a counter NC in a process 1104. As a result of addition, when the upper limit of the counter NC is exceeded, the counter NC maintains the upper limit as it is. Subsequently, a process 1106 compares the counter NC with a counter threshold Y. When the object live ratio exceeds the threshold X continuously Y times, the comparison result is set for YES and the live object of the zeroth generation heap is copied to the second generation heap through a process 1107. As a result of the process 1103, when the object live ratio is smaller than the threshold X, the value of the counter NC is reset through a process 1105 and the live object of the zeroth generation is copied to the first generation heap through a process 1108 in the same manner as a prior art. In the process 1103, the object live ratio exceeds the threshold X. When the counter NC is below the counter threshold Y in the process 1106, however, the comparison result is set for NO and the live object of the zeroth generation is copied to the first generation heap through the process 1108 in the same method as the prior art. The system copies the live object of the first generation heap copied through the process 1108 to the second generation heap after N minor collection cycles (usually, N is an integer of 1 to 4). The object of the second generation heap copied through the process 1107 is not copied until a major collection process is activated.

The modification example 1 in the embodiment of the present invention changes a copy destination of a live object according to an object live ratio and a counter NC.

Figure 13A:
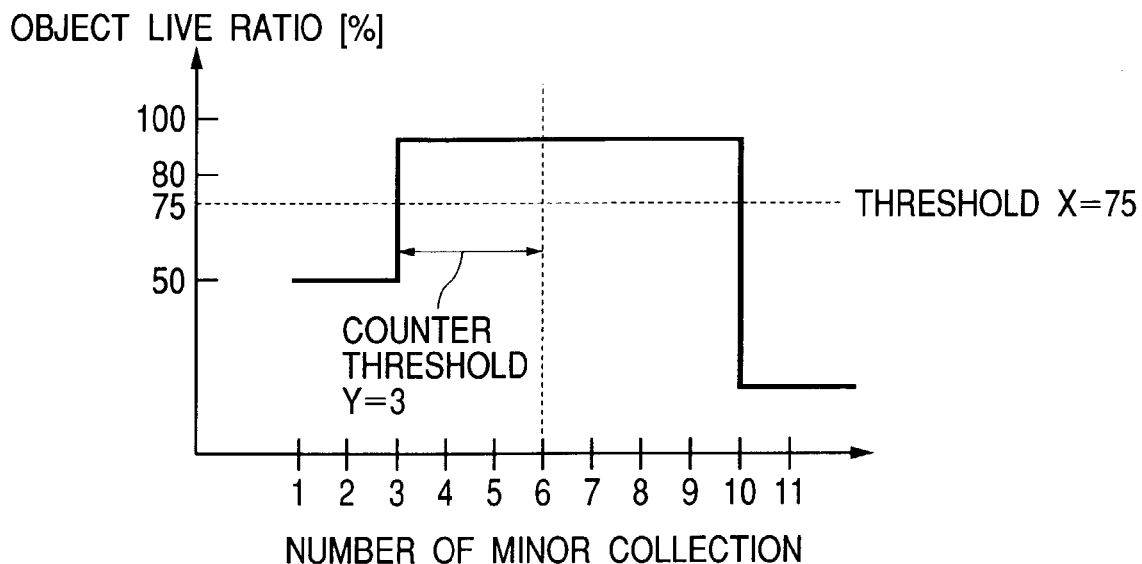
FIG. 13 shows the number of minor collection times and the transition of the object live ratio at program execution in a modification example of the embodiment of the present invention.

FIG. 13(*a*) shows the relationship between the number of minor collection times and an object live ratio at program execution. When a program is executed and the program issues a memory allocation request to the system, the system sequentially allocates a new object to a heap memory through a memory allocation process. In the program shown in FIG. 13(*a*), the object live ratio in the first and second minor collection is 50% and the object live ratio in the third to tenth minor collection is 90%. The programmer sets the threshold X of the object live ratio to 75% and the counter threshold Y to 3 according to a runtime parameter at program execution.

Because an object live ratio is lower than a threshold X to the third minor collection, the result of the process 1103 of FIG. 11 is NO and the live object of the zeroth generation is copied to the first generation through the process 1108 in the same manner as a conventional method. In the third minor collection, the object live ratio is 90% and exceeds the threshold X. The comparison result of the process 1103 is set for YES and the value of the counter NC is incremented in the process 1104. The counter NC is 1. The process 1106 compares the counter NC with the counter threshold. Because the counter threshold Y is 3, the comparison result is set for NO and the live object of the zeroth generation is copied to the first generation heap through the process 1108 in the same manner as the conventional method. The fourth and fifth minor collection are performed in the same manner as the third minor collection. On the other hand, in the sixth to tenth minor collection, the object live ratio is 90% and exceeds the threshold X. The comparison result of the process 1103 is set for YES. In the process 1104, 1 is added to the counter NC. In the sixth minor collection, the counter NC is 4. In the seventh minor collection, the value of the counter NC is set to 5. In the eighth minor collection, the counter NC is set to 6. The process 1106 compares the counter NC with the counter threshold Y. The comparison result is set for YES and the live object of the zeroth generation heap is copied to the second generation heap through the process 1107 unlike a prior art. A heap memory can be managed more efficiently by controlling a copy destination of a live object using both the object live ratio and the counter NC. In the embodiment of the present invention, if an object live ratio exceeds a threshold even once, the copy destination of the live object is changed. In the modification example 1, however, because the copy destination of the live object is changed for a program of which the object live ratio is high continuously, the heap memory can be managed more efficiently.

MODIFICATION EXAMPLE 2 OF EMBODIMENT

In the modification example 1 of the present invention, a copy destination of a live object was decided in accordance with a counter NC as well as an object live ratio in the object live ratio compare process 703, but in the modification example 2 of the present invention, two kinds of thresholds of the object live ratio are provided.

One of the thresholds of the object live ratio is used for changing the copy destination of the live object only when the threshold of the counter NC is exceeded. The other threshold is used for the copy destination of the live object regardless of the value of the counter NC if the object live ratio exceeds the threshold even once in the same manner as the embodiment of the present invention.

The two thresholds regarding an object live ratio and a counter threshold regarding a counter NC are set as runtime parameters at program execution respectively. Further, the system sets an initial value regarding each threshold.

In the modification example 2 of the present invention, the system uses the heap memory shown in FIG. 4. When the program allocates a memory block to a new object, a memory allocation request is issued to the system. The system receives the memory allocation request and allocates the new object to the object creating area 410 of the new-generation heap 402 shown in FIG. 4. When the object creating area 410 becomes full, the system activates the minor collection process 507.

FIG. 12 shows a detailed flow of the live object copy process 603 in the minor collection process 507. First, in a process 1202, an object live ratio is calculated. The object live ratio is calculated in the same method as the process 802 that calculates the object live ratio shown in FIG. 8. Subsequently, in a process 1203, an object live ratio and a threshold X are compared. When the object live ratio exceeds the threshold X, 1 is added to the counter NC in a process 1204. The count NC is initialized at 0 when the program execution starts. As a result of addition, when the value of the counter NC exceeds the upper limit of the counter, the counter NC is set for the upper limit. Subsequently, a process 1206 compares the counter NC with the counter threshold Y. As a result of comparison, when the object live ratio exceeds the threshold continuously Y times, the live object of the object creating area 411 is copied to the old-generation heap through a process 1208. In the process 1203, when an object live ratio is smaller than a threshold X, the counter NC is reset through a process 1205 and the live object of the object creating area 410 is copied to the aging area 411 through a process 1208 in the same manner as a prior art. The object copied to the aging area 411 is copied to the old-generation heap 401 after N minor collection cycles (usually, N is an integer of 1 to N). In the process 1206, the object live ratio exceeds the threshold X. When the value of the counter NC is below the counter threshold Y, however, a process 1207 compares an object live ratio with a threshold Z. As a result of comparison, when the object live ratio exceeds the threshold Z, the live object of the object creating area 410 is copied directly to the old-generation heap 401 through the process 1208. The object copied to the old-generation heap 401 is not copied until the major collection process 508 is activated. The process 1207 compares the object live ratio with the threshold Z. When the object live ratio is below the threshold Z, the live object of the object creating area 410 of the new-generation heap 402 is copied to the aging area 411 of the new-generation heap 402 through a process 1209 in the same method as the prior art and processing terminates.

The modification example 2 of the embodiment of the present invention is new in that a copy process of a live object is controlled according to two kinds of thresholds of an object live ratio and a threshold of a counter NC.

Figure 13B:
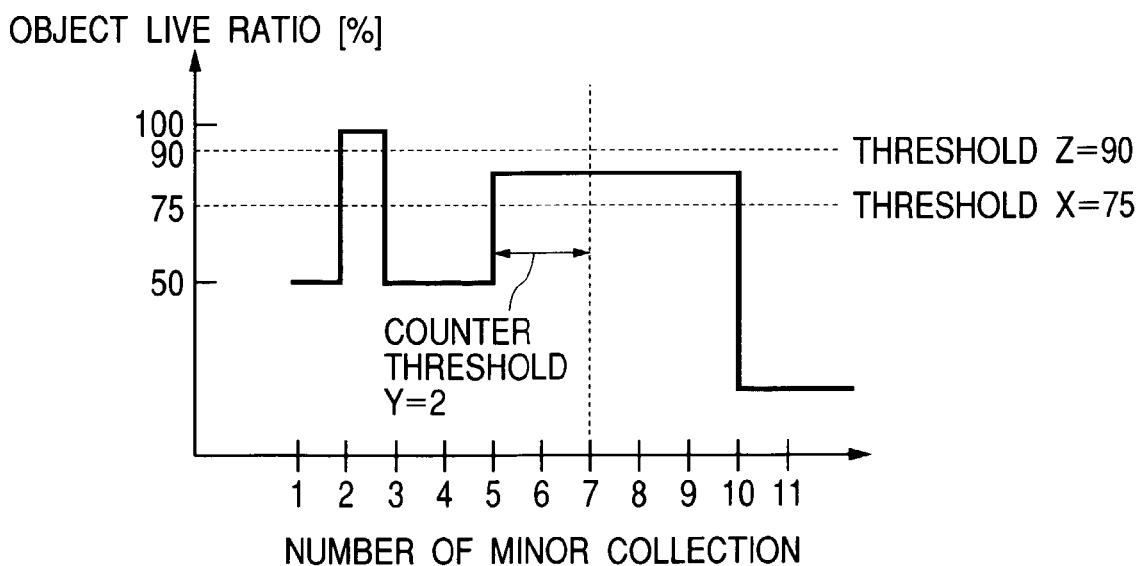

FIG. 13(b) shows the relationship between the number of minor collection times and an object live ratio at program execution. When a program is executed and the program issues a memory allocation request to a system, the system sequentially allocates a new object to the object creating area 410 of a new-generation heap through a memory allocation process. When a memory block to which the new object is allocated reaches a fixed size or a fixed period of time elapses, a minor collection process is activated. In the example of the program shown in FIG. 13(b), the object live ratio in the first minor collection is 50% and the object live ratio in the second minor collection is 95%. The object live ratio in the third and fourth minor collection reaches 50% again and the object live ratio in the fifth to tenth minor collection is 80%. The programmer sets the threshold X of the object live ratio to 75%, the threshold Z to 90%, and the counter threshold Y to 2 with a runtime parameter respectively.

In the first minor collection, because an object live ratio is smaller than a threshold X, the comparison result through the process 1203 shown in FIG. 12 is set for NO and the live object of the object creating area 410 is copied through the process 1209 to an aging area in the same method as a prior art. The live object copied to the aging area is copied to the old-generation heap after N minor collection cycles (N is an integer of 1 to 4). In the second minor collection, the object live ratio is 95% and exceeds the threshold Z. The comparison result through the process 1203 of FIG. 12 is set for YES and the value of the counter NC is 1. As a result, the comparison result through the process 1206 is set for NO and the comparison result through the process 1207 is set for YES. If the object live ratio exceeds the second threshold Z, because the copy destination of the live object is changed regardless of the counter NC, the live object of the object creating area 410 is copied to the old-generation heap through the process 1208. The object copied to the old-generation heap is not copied until program processing advances and a major collection process is activated. In the third and fourth minor collection, the object live ratio is 50% and smaller than the threshold X. In this case, the comparison result through the process 1203 is set for NO and the counter NC is reset. The live object of the object live ratio 410 is copied to the aging area 411 through the process 1209 in the same method as the prior art. In the fifth minor collection, the object live ratio is set to 80%. The object live ratio and the threshold X are compared through the process 1203. As a result, because the object live ratio exceeds the threshold X, the process 107 compares the object live ratio with the threshold. The object live ratio is 80% and the threshold is 90%. Because the comparison result is set for NO, the live object of the object creating area 410 of the new-generation heap 402 is copied through the process 1209 to the aging area 411 of the new-generation heap 402 in the same method as the prior art. On the other hand, in the seventh to tenth minor collection, because the object live ratio is always 80% and exceeds the threshold X, the comparison result of the process 1203 is set for YES. Further, because the threshold X is exceeded every time, the value of the counter NC increases like 3, 4, and 5. Subsequently, the process 1206 compares the value of the counter NC with counter threshold. Because the counter threshold Y is 2, the value of the counter NC exceeds the counter threshold Y and the comparison result is set for YES. The live object of the object creating area 410 is copied to the old-generation heap 410 through the process 1208.

In the modification example 2, two kinds of the thresholds of an object live ratio are provided in which the object live ratio increases suddenly and the object live ratio is high steadily. Because a copy destination of a live object can be changed corresponding to each case, fine heap memory management that matches the contents of program processing is enabled.

MODIFICATION EXAMPLE 3 OF EMBODIMENT

In the embodiment of the present invention and the modification examples 1 and 2, an object live ratio and a threshold of a counter NC are set as runtime parameters at program execution. In a modification example 3, a programmer sets the threshold to configure the program execution environment of the step 302 of FIG. 3. Otherwise, the programmer may also set the threshold in the static parameter setting of the step 304 of FIG. 3. Otherwise, the program execution environment in which the threshold is set previously can also be provided to the programmer. Further, it is also considered that the setting of the threshold is changed during program execution.

MODIFICATION EXAMPLE 4 OF EMBODIMENT

In a modification example 4 of the present invention, when an object live ratio exceeds a threshold in the live object copy process 603 of FIG. 6, a live object is not copied. When the object live ratio is equal to or below the threshold, the live object is copied to the same method as a prior art.

FIG. 14 shows a detailed flow of a live object copy process. The modification example 4 of the present invention differs in the operation of the live object copy process 704. The process 803 compares the object live ratio with the threshold X calculated in the process 802. When the object live ratio exceeds the threshold X, the comparison result is set for YES. In that case, processing terminates without moving the live object of the object creating area 410 of the new-generation heap 402. On the other hand, when the comparison result in the process 803 is NO, the live object is copied to the aging area 411 from the object creating area 410 through a process 1402 in the same method as a prior art. The live object copied through the process 1402 is copied to the old-generation heap 401 after N minor collection cycles (usually, N is an integer of 1 to 4).

As described above, when an object live ratio is higher than a threshold, because a live object of an object creating area of a new-generation heap is not copied, the copy processing that follows copying can be reduced. When the object live ratio is high, because copying is not performed from the object creating area to another area, the object creating area becomes full and a memory area may not be able to be allocated to the object. In that case, an empty area is created by performing major collection instead of minor collection.

In the modification example 4 of the present invention, an example in which a generational heap is provided with two generations of new and old, but the generational heap can be implemented similarly even using the generational heap provided with the third generation shown in FIG. 2. In this case, the object creating area may correspond to the zeroth generation, the aging area to the first generation, and the old-generation heap to the second generation respectively.

Further, in the modification example 4 of the present invention, an example of deciding a threshold using only an object live ratio, but the threshold may also be decided using the methods shown in the modification example 1 and the modification example 2.

Moreover, in the modification example 4 of the present invention, an object live ratio is calculated as a ratio of the size of a memory of a new-generation heap in which a new object is allocated during minor collection to the size of the memory in which a live object is allocated to the new object. The object live ratio may also be the size of the memory to which the live object is allocated or the number of live objects. Similarly, the threshold is also set as a ratio in the same manner as the object live ratio, but may also be the size of the memory to which the live object is allocated or the number of live objects. Further, in the embodiment of the present invention, the object live ratio is calculated currently based on information about the live object regarding the heap memory for minor collection, but the object live ratio may also be calculated based on a past history. In that case, even if the object live ratio process 702 is not performed in the live object copy process 603, the live object may be copied based on the object live ratio recorded in the heap memory management area 403.

According to the embodiment of the present invention, in the minor collection of generational garbage collection, when there are many new objects identified to be accessible from an application program, intermediate copy processing is reduced by copying a new object directly to an old-generation heap. At that time, the performance of the application program can be improved by reducing the effect on the prime processing of the application program.

Further, because an application programmer can explicitly set a threshold for changing a copy destination of an object at program execution, the optimum threshold can be set for every application. Even if a source program is not modified, the processing time of the application program can be reduced and a program development cost can be reduced.

Moreover, in comparison with the fourth well-known example, in the embodiment of the present invention, when an object live ratio is high, copy processing to a new-generation heap is reduced by copying a live object of an object creating area directly to an old-generation heap at minor collection. At that time, the processing performance of an application program can be reduced by reducing the effect in which the copy processing has on the prime processing of the program. Further, in an object-oriented programming style, because a programmer does not perform memory management, the programmer cannot set a threshold as an address. On the other hand, in the embodiment of the present invention, the processing performance of the application program can be improved without changing a source program by providing a threshold called an object live ratio independently of the address and allowing the programmer to have a means for setting the threshold as a runtime parameter at program execution.

According to the present invention, the processing performance of an application can be improved by reducing the number of copying times in the garbage collection of a heap.

What is claimed is:

1. A heap memory management method for managing a heap memory for creating and maintaining objects, said management method comprising:
   logically dividing said heap memory at least into a new-generation heap and an old-generation heap;
   allocating a memory block of said new-generation heap to a newly created object;
   conducting a plurality of minor collection steps performing garbage collection for said new-generation heap; and
   conducting a major collection step performing garbage collection for a heap including said old-generation heap; wherein, each of said minor collection steps includes sub-steps of:
      calculating an object live ratio of new objects created after a previous minor collection step, wherein the object live ratio is a percentage of a number of new objects survived;
      comparing said object live ratio with a predetermined threshold; and
      if said object live ratio is larger than the predetermined threshold, relocating all live objects of said new objects directly into said old-generation heap.

2. A heap memory management method according to claim 1, wherein
   said new-generation heap includes an object creating area for creating new objects therein and an aging area for copying all live objects survived at a current minor collection and for aging the copied objects through a maximum number of minor collections, and
   in each of said minor collection steps, all live objects in said object creating area are directly relocated into said old-generation heap, when said object live ratio is larger than the predetermined threshold.

3. A heap memory management method according to claim 2, wherein said object live ratio is a ratio of a memory size in said creating area where live objects are allocated to a memory size where new objects are allocated after a previous minor collection step.

4. A heap memory management method according to claim 2, wherein said object live ratio is a ratio of a number of live objects in said creating area to a number of new objects created after a previous minor collection step.

5. A heap memory management method for creating and maintaining objects, said management method comprising:
   logically dividing said heap memory at least into a new-generation heap and an old-generation heap;
   allocating a memory block of said new-generation heap to a newly created object; and
   conducting a generational garbage collection step composed of a plurality of minor collection steps performing garbage collection for said new-generation heap, and a major collection step performing garbage collection for a heap including said old-generation heap,
   wherein each of said minor collection steps does not copy live objects of new objects created after a previous minor collection step when an object live ratio of the new objects is higher than a threshold, wherein the object live ratio is a percentage of a number of new objects survived.

6. A heap memory management method for creating and maintaining objects, said management method comprising:

logically dividing said heap memory at least into a new-generation heap and an old-generation heap;

allocating a memory block of said new-generation heap to a newly created object;

conducting a plurality of minor collection steps performing garbage collection for said new-generation heap, and a major collection step performing garbage collection for a heap including said old-generation heap;

wherein each of said minor collection steps includes sub-steps of:

calculating an object live ratio of new objects created after a previous minor collection step, wherein the object live ratio is a percentage of a number of new objects survived;

comparing said object live ratio with a first threshold;

counting a number of times where said object live ratio continuously exceeded said first threshold through previous minor collection steps; and when said number of times exceeds a second threshold, relocating all live objects of the new objects in a latest-generation heap directly into said old-generation heap.

7. A heap memory management method for creating and maintaining objects, said management method comprising:

logically dividing said heap memory at least into a new-generation heap and an old-generation heap;

allocating a memory block of said new-generation heap to a newly created object;

conducting a plurality of minor collection steps performing garbage collection for said new-generation heap, and a major collection step performing garbage collection for a heap including said old-generation heap;

wherein each of said minor collection steps includes sub-steps of:

calculating an object live ratio of new objects created after a previous minor collection step, wherein the object live ratio is a percentage of a number of new objects survived;

comparing said object live ratio with a first threshold;

counting a number of times where said object live ratio continuously exceeded said first threshold through previous minor collection steps; and when said number of times exceeds a second threshold, relocating all live objects of said new objects directly into said old-generation heap;

when said number of times does not exceed said second threshold, comparing said object live ratio with a third threshold; and if said object live ratio is larger than said third threshold, relocating all live objects of said new objects directly into said old-generation heap.

* * * * *